United States Patent [19]

O'Hearn

[11] Patent Number: 4,595,734
[45] Date of Patent: Jun. 17, 1986

[54] MOLDING COMPOSITIONS

[75] Inventor: Thomas P. O'Hearn, Minneapolis, Minn.

[73] Assignee: Interplastic Corporation, Minneapolis, Minn.

[21] Appl. No.: 741,192

[22] Filed: Jun. 4, 1985

Related U.S. Application Data

[60] Continuation of Ser. No. 660,270, Oct. 15, 1984, abandoned, which is a continuation of Ser. No. 410,764, Aug. 23, 1982, abandoned, which is a division of Ser. No. 118,233, Feb. 4, 1980, abandoned.

[51] Int. Cl.$^4$ ............................................. C08L 63/02
[52] U.S. Cl. .................................... 525/524; 525/523; 525/531; 525/922
[58] Field of Search ............... 525/531, 922, 524, 107, 525/523; 528/124

[56] References Cited

U.S. PATENT DOCUMENTS

| | | | |
|---|---|---|---|
| 2,824,851 | 2/1958 | Hall | 525/331 |
| 3,179,623 | 6/1965 | Bowen | 528/205 |
| 3,221,043 | 11/1965 | Fekete et al. | 260/475 |
| 3,256,226 | 6/1966 | Fekete et al. | 260/23.5 |
| 3,297,745 | 1/1967 | Fekete et al. | 560/26 |
| 3,301,743 | 1/1967 | Fekete et al. | 161/494 |
| 3,317,465 | 5/1967 | Doyle et al. | 528/89 |
| 3,345,401 | 10/1967 | May | 560/209 |
| 3,564,074 | 2/1971 | Swisher | 525/922 |
| 3,621,093 | 11/1971 | Svoboda | 264/331.12 |
| 3,631,127 | 12/1971 | Nomura et al. | 525/331.1 |
| 3,637,618 | 1/1972 | May | 525/531 |
| 3,786,004 | 1/1974 | Furuya et al. | 260/2.5 N |
| 3,810,825 | 5/1974 | Mani | 525/331 |
| 3,855,160 | 12/1974 | Shiotsu et al. | 260/2.5 N |
| 4,081,492 | 3/1978 | Traenckner et al. | 525/331 |
| 4,085,018 | 4/1978 | Ariga et al. | 525/331 |
| 4,197,390 | 4/1980 | Jackson | 528/115 |
| 4,359,370 | 11/1982 | De La Mare et al. | 204/159.15 |

FOREIGN PATENT DOCUMENTS

| | | |
|---|---|---|
| 888274 | 12/1971 | Canada . |
| 1960999 | 6/1970 | Fed. Rep. of Germany . |
| 53-132099 | 11/1978 | Japan . |

OTHER PUBLICATIONS

Handbook of Epoxy Resins, Lee et al. (1967), McGraw-Hill Book Company, p. 9-5.
"A New Resin & a New Concept for High Performance Vinyl Ester Premix Molding", Jacobs et al, Interplastic Corp., SP1-5B, 1979.
"Encyclopedia of Polymer Science & Technology", vol. 1, pp. 854, 855, 856, 862, 863.
"Epoxy Resins", Skeish & Somerville, 22-26; 42-44.
84 C.A. #2, 12 Jan. '76, 137, col. 2, #72069, Van Vooren, Gerard.
May et al, "Epoxy Resins Chemistry and Technology", 1973, M. Dekker, Inc., N.Y., p. 143, lines 29-34.

Primary Examiner—Theodore E. Pertilla
Attorney, Agent, or Firm—Kinney & Lange

[57] ABSTRACT

Epoxide-vinyl ester resins having significant amounts of epoxide and ethylenically unsaturated groups may be thickened by reaction thereof with polyfunctional amines. The resulting resinous products, when molded at elevated temperatures, exhibit increased viscosity and controlled flow.

15 Claims, No Drawings

MOLDING COMPOSITIONS

REFERENCE TO CO-PENDING APPLICATION

This application is a continuation of pending application Ser. No. 06/660,270 filed Oct. 15, 1984, abandoned as of the filing date of the present application, which is a continuation of pending application Ser. No. 06/410,764 filed Aug. 23, 1982, abandoned as of the filing date of the present application, which is a division of application Ser. No. 118,233, filed Feb. 4, 1980, now abandoned.

TECHNICAL FIELD

Various epoxy resins and vinyl ester resins derived therefrom have been employed both in bulk and in sheet form as molding materials in the fabrication of such products as appliance housings, automotive parts, and moded pipe fittings. Vinyl ester resins are well-known to the art, and commonly are derived from epoxide terminated resins by reaction thereof with low molecular weight, $\alpha,\beta$-unsaturated organic acids, the resulting resins being substantially free of epoxide groups and having ethylenically unsaturated terminal groups. The resulting resins may be cross-linked, or cured, by the use of heat alone or in combination with other ethylenically unsaturated polymers or monomers, the reaction being essentially addition polymerization. The crosslinking reaction may be catalyzed by such free radical initiators as peroxy catalysts, for example, benzoyl peroxide. To the resin may be added various fillers such as talc, chopped glass fibers and the like as may be desired or needed for a particular application.

Molding resins of the type described must have the capacity to melt and flow at molding temperatures, and also must have the ability to gel or harden in the mold via cross-linking. The amount of resin flow during molding may be controlled to some extent by the temperature of the mold surfaces. However, if the mold temperature is unduly high, the resin may gel or harden before flow has been achieved to all areas of the mold. On the otherhand, if the mold temperature is too low (for the purposes of avoiding undue resin flow), then the period of time required for the resin to gel or harden is increased, leading to reduced production capacity and increased unit cost. The resins are routinely molded at temperatures in the range of about 250°-320° F. In this approximate temperature range, the resins may gel, for example, in 2.5 minutes. For the most part, vinyl ester resins in this temperature range are rather watery and tend to flow too easily, resulting in the production of "flash" about the junction of interfaced mold parts. Further, the resin in its runny, low viscosity state does not readily entrain glass fibers or similar fillers, and as a result such fillers may not be carried uniformly by the resin to all parts of the mold cavity.

Various prior art researchers have attempted to reduce the runny characteristic of such resins during the molding procedure by various means. MgO or urethane additives, however, produces resins which, for many purposes, are not significantly chemically inert. Moreover, the viscosity of the resulting resins at molding temperatures is highly sensitive to the concentrations of such additives, and hence reproduceability may be difficult to achieve.

BACKGROUND ART

The present invention relates to a polymeric, thermosetting molding composition which exhibits controlled flow when subjected to elevated molding temperatures and pressures. Broadly speaking, it has been found that a superior molding composition can be produced by preparing epoxide-vinyl ester resinous compositions derived from epoxide resins and having significant quantities of vinyl ester terminal groups (having $\alpha,\beta$ ethylenic unsaturation) and significant quantities of epoxide terminal groups, and reacting the epoxide groups with a sufficient quantity of a polyfunctional amine to significantly raise the viscosity of the resulting resinous materials when the latter is subjected to molding temperatures. Incorporated in the compositions may be free-radical initiator catalysts and ethylenically unsaturated monomers, together with such fillers, pigments and the like as may be desired. Exposure of the resulting compositions to pressures at molding temperatures in the range of about 250° F. (about 121° C.-160° C.) causes the compositions to soften and controllably flow within the mold cavities, and culminates in cross-linking or curing of the compositions via the addition reaction through ethylenically unsaturated groups of the resins and monomers.

In one embodiment, the invention relates to an epoxide-vinyl ester resin composition having significant quantities of both epoxide terminal groups and ethylenically unsaturated terminal groups. The resin composition desirably is derived from an epoxide-terminated resin by reaction of a significant portion of the epoxide groups with an organic, desirably monobasic acid having $\alpha, \beta$, ethylenic unsaturation, the resin retaining a significant quantity of terminal epoxide groups. The composition desirably contains, as a catalyst, a peroxy free-radical initiator such as 2,5-dimethyl-2,5-bis(2-ethylhexanolyperoxy)hexane, t-butyl perbenzoate and 1,1-di-tert.butylperoxy-3,3,5-trimethyl cyclohexane (as a 75% solution), and, desirably, an organic, ethylenically unsaturated monomer such as styrene, the monomer being present in a quantity providing up to about 13, (desirably 0.7 to 13 and most preferably 0.7 to about 7) times the stoichiometric amount of monomer required to react with the ethylenically unsaturated groups of the resin.

In another embodiment, the invention relates to the resinous reaction product of an epoxide-vinyl ester resin having significant quantities of epoxide and ethylenically unsaturated terminal groups, with a polyfunctional amine reactable with epoxide groups of the resin and in sufficient quantity to provide the resulting resin with a viscosity significantly greater than (preferably, at least twice as great as) the viscosity of the epoxide-vinyl ester resin at molding temperatures, the reaction product retaining the reactive ethylenically unsaturated groups. The resinous reaction product desirably also contains a free-radical initiator catalyst such as the peroxy catalyst exemplified above and, desirably, an ethylenically unsaturated monomer such as styrene, in an amount providing up to 13 and preferably from about 0.7 to 7.0 times the amount required for stoichiometric reaction with ethylenically unsaturated groups of the resinous reaction product.

In yet another embodiment, the invention relates to a method for providing a vinyl ester-type molding composition having controlled flow at elevated molding temperatures in the range of 250° F.-320° F. (about 121°

C.–160° C.) which comprises reacting an epoxide terminated resin with less than a stoichiometric amount of an organic acid having α,β ethylenic unsaturation to provide an epoxide-vinyl ester resin having significant quantities of epoxide and ethylenically unsaturated terminal groups. The resulting resin is then reacted, through its epoxide groups, with a reactive polyfunctional amine in sufficient quantity to provide the resinous reaction product with a viscosity at molding temperatures significantly greater than that of the epoxide-vinyl ester resin.

In a further embodiment, the invention relates to a two-part resin system of which the parts are combinable and reactable to provide a moldable, thermosetting composition having controlled flow at molding temperatures. One part compreses an epoxide-vinyl ester resin having significant quantities of both epoxide and ethylenically unsaturated terminal groups, and desirably an ethylenically unsaturated monomer in the range of up to 13 and preferably from 0.7 to 7.0 times the stoichiometric amount required to react with the ethylenically unsaturated groups of the resin. The other part comprises an epoxide-reactive, polyfunctional amine, preferably a tertiary amine, in sufficient quantity to react with epoxide terminal groups of the resin and to provide a resinous reaction product having reactive, ethylenically unsaturated groups and characterized by a viscosity at molding temperatures significantly greater than that of the epoxide-vinyl ester resin.

Although the preferred embodiments employ epoxide-vinyl ester resins having epoxide and vinyl ester groups in the same molecule, an operative embodiment of the invention, which may be preferred for some uses, may employ an epoxide vinyl ester resinous composition in which the epoxide and vinyl ester groups are supplied by different molecular species.

DISCLOSURE OF THE INVENTION

The epoxide-vinyl ester resin employed in the invention desirably is derived from an epoxide-terminated resin by reaction of the latter with less than a stoichiometric quantity of an organic carboxylic acid having α,β-ethylenic unsaturation to provide the resin with a significant quantity of ethylenically unsaturated groups, the resin retaining a significant quantity of epoxide groups. The ethylenically unsaturated terminal groups are reactive with each other and with such ethylenically unsaturated monomers as styrene during cure of the resin. Although substantially any epoxide resin may be employed as the starting resin, it is preferred to employ diglycidyl ether epoxy resins of the type derived from a bisphenol compound such as Bisphenol-A and a haloepoxy-substituted alkane such as epichlorohydrin. Other epoxy resin starting materials which can be employed include the epoxidized phenolformaldehyde novolac resins, and epoxy resins derived from polyhydric alcohols such as alkane-diols, -triols, and the like.

Particularly desired epoxide resin starting materials are the di-epoxide resins derived from Bisphenol-A and epichlorohydrin and having the general formula

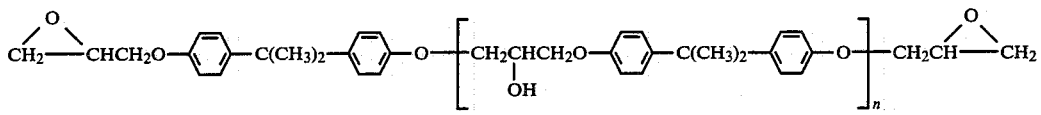

in which n is an integer of from zero through five. Such resins desirably exhibit an epoxide equivalent weight in the range of from about 170 to about 880; an epoxide equivalent weight of about 500 being preferred. The epoxidized novolac resins include those of the general formula

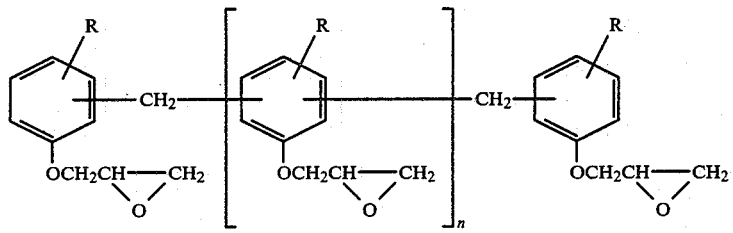

in which R is hydrogen or lower alkyl ($C_1$–$C_4$) and n is an integer from zero to five. The epoxide resins derived from polyhydric alcohols include aliphatic poly epoxide resins such as those of the formula $$R'''\!\!-\!\!\left[O\!\left(CH_2CHO\right)_{\!\overline{n}}CH-\overset{R''}{\underset{|}{CH}}-\overset{O}{\overset{\diagdown}{\underset{\diagup}{CH_2}}}\right]_m$$

in which R' is a polyvalent radical of an aliphatic polyol of the formula R'''(OH)$_m$ such as glycerol, ethylene glycol, pentaerythritol, cyclohexanediol, etc; R' and R" are individually H or lower alkyl, m is an integer of from 2 to 4 and n is an integer of from 1–15, preferably 6–10, as set out in U.S. patent application Ser. No. 923,958 filed July 13, 1978.

Epoxide resins, and processes for converting such epoxide resins to vinyl ester resins by reaction with organic acids having α-βethylenic unsaturation are taught, for example, in U.S. Pat. Nos. 3,317,465; 3,345,401 and 3,256,226, the disclosures of which are incorporated herein by reference.

The epoxide-vinyl ester resin of the invention retains a significant number of unreacted epoxide groups. For example, if substantially all of the epoxide groups of a standard Bisphenol-A-epichlorohydrin derived epoxy resin were reacted with an organic acid having ethylenic unsaturation, such as methacrylic acid, the resulting resin could have an epoxide equivalent weight of about 5,000 to 7,000 or more. By reducing the quantity of organic acid below that required to stoichiometrically react with all of the epoxide groups of the epoxide resin, the epoxide equivalent weight may be reduced, for example, to about 1,200 to 2,000, the reaction mixture commonly including some unreacted organic acid.

Epoxy resins useful in the practice of the present invention desirably are of the formula

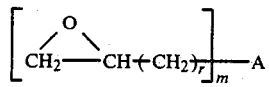

wherein A is a polyvalent radical derived from a resinous polyhydric phenol (including polynuclear phenols) or a polyhydric aliphatic compound, by removal of the hydric hydrogen atoms; r is an integer of from 0 to 10, and m is at least 1 and preferably is in the range of 1–3. The resin resulting from the reaction of this resin with less than a stoichiometric quantity of an α-βethylenically unsaturated organic acid such as methacrylic acid desirably is of the formula

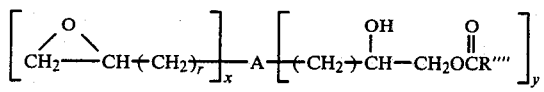

in which A and r are as described above, and in which R'''' is the radical of an aliphatic, ethylenically unsaturated carboxylic acid having α,β-unsaturation and having the formula R''''COOH, x and y are both greater than zero and preferably are greater than 0.05, and x plus y is at least 1 and preferably is in the range of 1–3, and x/y is in the range of 5/1 to 1/5 and preferably in the range of from about 1/1 to about 1/2. Most preferably, x is not less than about 0.15 and y is not less than about 0.3.

The organic carboxylic acid having ethylenic unsaturation desirably is monobasic and may be selected from the group which includes such monobasic acids as acrylic, methacrylic, crotonic, isocrotonic, cinnamic and the like, and higher alkylated acrylic acids such as ethyl, propyl and butyl-substituted acrylic acids. Dicarboxylic acids are typified by maleic and fumaric acids. It is also possible to employ half-esters formed by esterification of one mole of a hydroxy compound (such as an alcohol) with one mole of an anhydride of an ethylenically unsaturated dicarboxylic acid such as maleic acid anhydride. Speaking broadly, the unsaturated organic acid should have at least one carboxyl group and should further have ethylenic unsaturation so as to provide the epoxide-terminated resin with a significant number of ethylenically unsaturated terminal groups which in turn may participate in addition polymerization reactions with ethylenically unsaturated groups of the epoxide vinyl ester resin, or, preferably, with the ethylenically unsaturated groups of such monomers as styrene and the like.

The amines employed in the invention are epoxide-reactive at room temperature or at slightly elevated temperatures e.g., up to about 45° C., but are generally non-reactive with the ethylenically unsaturated groups of the resin. Amines of the invention are capable of reaction with the epoxide-vinyl ester resin to greatly increase the viscosity of the resin even at elevated molding temperatures in the range of about 250° F.–350° F. (about 121° C.–160° C.) and it is believed that the viscosity increase is due to chain-extension of the epoxide-vinyl ester resin through the epoxide groups, with the amine serving as a linking group. Candidate amines may be tested by mixing them with an epoxide-vinyl ester resin such as that described in Example 1 below, in the ratio of 0.625 nitrogen equivalents of the amine per epoxide equivalent of the resin. An effective amine should cause a significant viscosity increase in the resin within 24 hours at room temperature and should not react substantially with the vinyl ester portion of the resin, as evidenced by infrared spectrophotometry by a strong peak at 1640 cm$^{-1}$ both before and after reaction with the amine.

The amount of amine to be employed will vary in accordance with the nature of the epoxide-vinyl ester resin and also the nature of the amine, and can readily be determined by trial and error. With respect to tertiary amines such as 2,4,6-tris(dimethylaminomethyl) phenol and many other amines, one may employ as a guideline an amount of amine supplying from about 0.25 to about 1.0 (preferably 0.5 to 0.68) amine nitrogen equivalents per epoxide equivalent of the epoxide-vinyl ester resin.

Of the wide variety of amines that can be employed, those amines that catalyze the rapid curing of epoxide resins when used in small quantities are preferred. The viscosity of the amine-epoxide vinyl ester mixture desirably increases rapidly at room temperature and then levels off without causing gelation of the resin, the viscosity increasing by at least 50% and desirably at least doubling within 24 hours. Tri-tertiary amines, typified by 2,4,6-tris(dimethylaminomethyl)-phenol, are preferred.

The epoxide-vinyl ester resin must retain a sufficient number of epoxide groups so that the reaction product between it and the amine produces a highly viscous resin. On the ther hand, the epoxide groups must be sufficiently few in number as to avoid premature cross-linking or gelation of the resin as a result of the epoxide-amine reaction. Further, a sufficient number of ethylenically unsaturated groups must be present in the epoxide-vinyl ester resin to permit cross-linking to occur within a heated mold and to result in a hard, tough, chemical-resistant product. For example, it has been found that if an epoxide resin derived from Bisphenol-A and epichlorohydrin is reacted with methacrylic acid in an amount sufficient to react with only twenty percent of the epoxide groups, and then is reacted with 2,4,6-tris(dimethylaminomethyl) phenol, gelation occurs at a rapid rate and thus results in an unfavorably brief useful life prior to molding. On the other hand, if the same epoxide resin (epoxide terminated), after reaction with methacrylic acid, is left with but a very low concentration of epoxide groups (e.g., less than about five percent of those initially present), then the epoxide-vinyl ester resin, upon reaction with an amine, does not thicken satisfactorily. Accordingly, an epoxide-vinyl ester resin derived from Bisphenol-A and epichlorohydrin desirably retains from about 15% to about 70% of the epoxide groups initially present in the epoxide resin from which it was derived. Approximately the same limits can be applied to an epoxide-vinyl ester resin derived from an aliphatic epoxide resin. Since the epoxide functionality of epoxide-terminated novolac resins is ordinarily somewhat higher than other epoxide resins, it is desired that the epoxide-vinyl ester resin derived from such novolac resins retain a somewhat lesser percentage of its original epoxide groups, e.g., from about 5% to about 50%.

It will be understood that the resin composition of the invention may include glass fibers or other fillers, pigments and the like, Further, although the above description has referred primarily to use of a single amine, a single ethylenically unsaturated monomer, etc., it will be understood that mixtures of such amines and mixtures of such monomers may be employed as well as mixtures of epoxide-terminated and vinyl-terminated resins.

The invention may be more readily understood with reference to the following non-limitive examples, the products of which each were capable of being molded at molding temperatures into shell-like objects.

EXAMPLE I

A commercially available epoxide resin derived from Bisphenol-A and epichlorohydrin and having an epoxide equivalent weight of 190 was reacted with additional Bisphenol-A (serving as a chain extender) to increase the epoxide equivalent weight, to about 500. To the resulting epoxide-terminated resin was added methacrylic acid in an amount equal to about 60% of the amount required to react with the epoxide groups of the resin, and also 0.1% of 2,4,6-tris(dimethylaminomethyl) phenol as a catalyst and 0.024% of toluene hydroquinone to inhibit reaction between ethylenically unsaturated groups of the resulting epoxide-vinyl ester resin. After reaction at 250° F. (121° C.) for 2 hours, approximately 60% of the epoxide groups had reacted with the acid to form vinyl ester terminal groups. To the resinous product was added styrene monomer in an amount sufficient to reduce the viscosity of the resulting resin, at room temperature, to about 2000 cps.

To a measured quantity of the resulting resinous product was added 50% by weight of short chopped glass fibers, 1.0% of 2,5-dimethyl-2,5-bis(2-ethylhexanolyperoxy) hexane as a peroxy free radical initiator catalyst and sufficient 2,4,6-tris(dimethylaminomethyl) phenol to provide 0.625 nitrogen equivalents of the amine per epoxide equivalent of the resin. The mixture was stirred at room temperature until the glass fibers were thoroughly wetted. The mixture was allowed to stand for 24 hours at room temperature, following which it was cut into small pieces suitable for charging to a mold. An appropriate weight of the pieces was then charged to the cavity of a mold preheated to 280° F. (137.7° C.), and the mold was closed and placed under a pressure of 1000 p.s.i. for four minutes. Upon opening the mold, the resin pieces were found to have flowed to all portions of the mold cavity and had hardened, the chopped glass filler remaining homogeneously distributed through the molded item. The item was found to be hard, tough and chemically resistant.

EXAMPLE II

Example I was repeated, except that the glass fibers were omitted from the mixture of the epoxide-vinyl ester resin and the amine. The resin, while still warm and fluid, was divided into two portions which were charged to separate hoppers above a coating machine, and the hoppers were adjusted to discharge the resinous product at a uniform rate upon a moving polyethylene film substrate. Between the two hoppers was placed a discharge port through which chopped glass fibers were discharged onto the warm resin layer discharged by the first hopper, the resinous discharge of the second hopper covering the layer of glass fibers thus deposited. The resulting "sandwich" type construction was wound, with the polyethylene film substrate, onto a large roll, the rolling procedure tending to "work" the resin-glass fiber sandwich and to distribute the glass fibers somewhat more uniformly within the resin. The roll was permitted to cool slowly, and at room temperature the resin-glass fiber "sandwich" was found to be tough and leathery. The sheet molding compound thus prepared was cut to an appropriate size with scissors and placed inside a preheated mold for making a shell-like object. The molding temperature was approximately 280° F. (137.7° C.). After several minutes, the mold was opened and the resulting molded article, which was found to be tough, strong and chemically resistant, was removed. The sheet molding compound had flowed to all portions of the interior cavity of the mold, and little flash was observed. Of importance, the resin, while flowing during the molding cycle, was found to have entrained the glass fibers, the latter being substantially homogeneously distributed throughout the molded part.

EXAMPLE III

The epoxide-vinyl ester mixture with added amine and essentially the same as is described in Example 1 was allowed to stand at room temperature for several days, during which the viscosity, as measured, with a rotating spindle viscometer, increased as follows:

| Time | Viscosity, Cps. |
| --- | --- |
| Initial | 4750 |
| 60 min. | 7200 |
| 130 min. | 12,760 |
| 3 hours | 11,500 |
| 4 hours | 31,100 |
| 5 hours | 45,900 |
| 24 hours | 668,000 |
| 3 days | 2,000,000 (approx.) |

EXAMPLE IV

To a novolac epoxide resin having an epoxide equivalent weight of about 172 (DEN-431, Dow Chemical Co.) was added methacrylic acid in an amount necessary to react with approximately 72% of the epoxide group of the resin. The resulting reaction was continued until the resin exhibited an epoxide equivalent weight of 667.5 and an acid number of less than about ten. To the resulting resin was added styrene monomer, the thus-thinned resin-styrene mixture containing 30% styrene by weight. 2,4,6-tris-(Dimethylaminomethyl) phenol was mixed into the mixture at a ratio of 2.5 parts by weight of the amine per 100 parts by weight of the resin, and the use in viscosity, at room temperature, as reported below, was monitored.

| Time | Viscosity (Cps) |
| --- | --- |
| Initial | 240 |
| 72 hours | 7000 |
| 9 days | 100,000 (approx.) |

EXAMPLE V

To 400 g. of an epoxide-vinyl ester resin as described in Example I and having an epoxide equivalent weight of about 1300 and an acid number of about 4.5 was added 4.12 grams of diethylene triamine. The mixture was stirred and then allowed to stand at room temperature. Viscosity measurements (rotating spindle viscometer) over a 16 day period yielded the following results:

| Time | Viscosity, (Cps) |
| --- | --- |
| Initial | 4,500 |
| 20 hours | 14,500 |
| 2 days | 26,000 |
| 5 days | 71,000 |
| 6 days | 66,500 |
| 9 days | 116,000 |
| 13 days | 128,000 |
| 16 days | 176,000 |

EXAMPLE VI

To 400 g. of an epoxide-vinyl ester resin as described in Example I and having an epoxide equivalent weight of about 1300 and an acid number of about 4.5 was added 9.91 g. of 4-4'-methylene dianiline, the latter from a styrene solution containing 25% 4,4'-methylene dianiline by weight. The mixture was stirred and then allowed to stand at room temperature. Viscosity measurements yielded the following results:

| Time | Viscosity (Cps) |
| --- | --- |
| Initial | 900 |
| 20 hours | 1480 |
| 2 days | 2770 |
| 3 days | 4100 |
| 7 days | 8762 |
| 10 days | 15,000 |
| 14 days | 17,280 |
| 17 days | 20,700 |

EXAMPLE VII

To a mixture of epoxide resins comprising 56% by weight of the diglycidyl ether of propylene glycol (an aliphatic epoxide sold a DER 732, Dow Chemical Co.) was added sufficient methacrylic acid to react with 74% of the epoxide groups of the resin mixture. When the reaction had progressed to a measured epoxide equivalent weight of about 1200 and an acid number of 10.0, the reaction mixture viscosity was reduced by addition of styrene monomer, the resultant mixture contained 25% styrene by weight. The mixture was cooled to room temperature, and 2.5% by weight of 2,4,6-tris-(dimethylaminomethyl) phenol was added with stirring. The viscosity of the mixture at room temperature increased as follows:

| Time | Viscosity (Cps.) |
| --- | --- |
| Initial | 2,500 |
| 2 days | 44,250 |
| 9 days | 92,500 |

EXAMPLE VIII

The procedure of Example I for forming the epoxide-vinyl ester resin was repeated, except that sufficient methacrylic acid was employed to react with substantially all of the epoxide groups to yield a vinyl ester resin substantially free of unreacted epoxide groups (having a measured epoxide equivalent weight exceeding 5500). Into 710.53 g. of this resin were mixed 35.52 g. of the diglycidyl ether of Bisphenol-A having an epoxide equivalent weight of about 186 ("Epon 828", Shell Chemical Company) and 18.6 g. of 2,4,6-tris-(dimethylaminomethyl) phenol. The mixture was allowed to stand at room temperature, and the viscosity of the mixture was observed to increase as follows:

| Time | Viscosity (Cps) |
| --- | --- |
| Initial | 1172 |
| 22 hours | 6860 |
| 2 days | 20,200 |
| 4 days | 110,000 (Approx.) |

While I have described a preferred embodiment of the present invention, it should be understood that various changes, adaptations, and modifications may be made therein without departing from the spirit of the invention and the scope of the appended claims.

What is claimed is:

1. Composition comprising the reaction product of
   (a) an epoxide resin;
   (b) a vinyl ester resin; and
   (c) an organic polyfunctional amine; said epoxide resin and organic polyfunctional amine being present in a quantity greater than 0.25 amine equivalent per epoxide equivalent to provide a thickened reaction product having a viscosity between 50% greater than the vinyl ester resin within one day and the gelation point of the reaction product, and said thickened reaction product characterized by a measurable viscosity at ambient temperature below the gelation point of the reaction product for approximately at least one day with said epoxide resin and vinyl ester resin being present in a quantity such that terminal ethylenically unsaturated groups are equal to or greater in number than the terminal epoxide groups in the reaction product and containing a sufficient number of terminal ethylenically unsaturated groups for subsequent reaction.

2. A composition as in claim 1 wherein the vinyl ester resin is derived from and epoxide terminated resin by reaction thereof with an organic acid having $\alpha,\beta$-ethylenic unsaturation in an amount sufficient to react with substantially all of the epoxide terminated resin.

3. A composition as in claim 2 wherein the epoxide resin comprises the diglycidyl ether of Bisphenol-A and wherein the organic amine comprises 2,4,6-tris-(dimethylaminomethyl)phenol.

4. Process comprising:
   (a) providing a resinous composition containing a quantity of terminal epoxide groups and terminal ethylenically unsaturated groups with the number of terminal epoxide groups being equal to or less than the terminal ethylenically unsaturated groups and the terminal epoxide groups being insufficient in number to substantially crosslink the resinous composition by epoxide reaction;
   (b) combining with said resinous composition an amount of organic polyfunctional amine for reaction with substantially only the terminal epoxide groups and in an amount sufficient to at least increase the viscosity of the resinous composition by greater than 50% within one day while keeping the viscosity at a measurable level below the gelation point of the resin at ambient temperature for approximately at least one day.

5. A process as in claim 4 wherein the resinous composition comprises the reaction product of an epoxide terminated resin with less than the stoichiometric quantity of an organic acid having α,β-ethylenic unsaturation required for the reaction with substantially all of the terminal epoxide groups of the epoxide terminated resin and has a ratio of terminal epoxide groups to terminal ethylenically unsaturated groups within the approximate range of from about 1/1 to about 1/2.

6. A process as in claim 4 wherein the resinous composition comprises a mixture of an epoxide-terminated resin and a resin having ethylenically unsaturated terminal groups.

7. A process as in claim 6 wherein the resin having ethylenically unsaturated terminal groups comprises the reaction product of an epoxide terminated resin with the stoichiometric quantity of an organic acid having α,β-ethylenic unsaturation required for reaction with substantially all of the terminal epoxide groups of the epoxide terminated resin.

8. A process as in claim 4 wherein said organic, polyfunctional amine comprises a tertiary amine which is combined with the resinous composition in an amount of from about 0.25 to about 1.0 amine nitrogen equivalents per epoxide equivalent of the resinous composition.

9. A process as in claim 8 further comprising combining with said resinous composition and said polyfunctional amine
   (i) an ethylenically unsaturated liquid monomer in a quantity ranging from about 0.7 to about 13 times the stoichiometric amount required for reaction with substantially all of the terminal ethylenically unsaturated groups in the resinous composition;
   (ii) a quantity of chopped glass fibers; and
   (iii) a catalytic quantity of a peroxy, free-radical initiator catalyst; and
   (iv) heating the combination to a temperature within the range of from about 121° C.–160° C.

10. The process of claim 4 wherein the resinous composition is an epoxide-vinyl ester resin derived from bisphenol-A and epichlorohyrin having retained approximately 15 to 70% of the epoxide groups after combination with methacrylic acid.

11. The process of claim 4 wherein the resinous composition is an epoxide-vinyl ester resin derived from a novolak resin having retained approximately 5 to 50% of the epoxide groups.

12. A molding process comprising:
   combining an epoxide terminated resin with an organic acid having α,β-ethylenic unsaturation to form an epoxide-vinyl ester resin having a greater number of terminal ethylenically unsaturated groups than terminal epoxide groups and the terminal epoxide groups being insufficient in number to substantially crosslink the epoxide-vinyl ester resin; and
   combining the epoxide-vinyl ester resin with an epoxide reactive organic amine that is substantially nonreactive with the terminal ethylenically unsaturated groups in a quantity greater than approximately 0.25 amine equivalents per epoxide equivalent of the epoxide-vinyl ester resin to obtain a reaction product having a measurable viscosity at ambient temperature for approximately at least one day, the viscosity being at least 50% greater than the epoxide vinyl ester resin within one day and less than the viscosity at a gelation point of the reaction product.

13. The process of claim 12 and further including placing the reaction product in a mold for curing.

14. The process of claim 12 wherein the reaction product is formed by reaction of the terminal epoxide groups through the amine while the terminal ethylenically unsaturated groups are substantially unreacted to effect a minimum of crosslinking.

15. The process of claim 12 wherein the increase in the viscosity from the combination of the epoxide-vinyl ester resin and the amine occurs within approximately 24 hours.

* * * * *

UNITED STATES PATENT AND TRADEMARK OFFICE
CERTIFICATE OF CORRECTION

PATENT NO. : 4,595,734

DATED : June 17, 1986

INVENTOR(S) : Thomas P. O'Hearn

It is certified that error appears in the above-identified patent and that said Letters Patent is hereby corrected as shown below:

In claim 2, column 10, line 43, the word "and" should read --an--.

In claim 4, column 10, line 66, the word "temperature" should read --temperatures--.

Signed and Sealed this

Twenty-first Day of October, 1986

[SEAL]

Attest:

DONALD J. QUIGG

Attesting Officer

Commissioner of Patents and Trademarks